(12) United States Patent
Monjas Llorente et al.

(10) Patent No.: US 8,104,071 B2
(45) Date of Patent: Jan. 24, 2012

(54) DELEGATION OF USER'S CONSENT IN FEDERATION OF SERVICES AND IDENTITY PROVIDERS

(75) Inventors: Miguel Angel Monjas Llorente, Madrid (ES); Carolina Canales Valenzuela, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 750 days.

(21) Appl. No.: 12/089,698

(22) PCT Filed: Oct. 11, 2005

(86) PCT No.: PCT/SE2005/001503
§ 371 (c)(1),
(2), (4) Date: Aug. 20, 2008

(87) PCT Pub. No.: WO2007/043920
PCT Pub. Date: Apr. 19, 2007

(65) Prior Publication Data
US 2009/0158393 A1    Jun. 18, 2009

(51) Int. Cl.
*G06F 7/04* (2006.01)
(52) U.S. Cl. .......................................................... 726/3
(58) Field of Classification Search .................. None
See application file for complete search history.

(56) References Cited

U.S. PATENT DOCUMENTS

| | | | | |
|---|---|---|---|---|
| 2002/0184496 A1* | 12/2002 | Mitchell et al. | ............... | 713/168 |
| 2004/0260949 A1* | 12/2004 | Aoki et al. | .................... | 713/201 |

FOREIGN PATENT DOCUMENTS

WO    WO 2004/114087 A    12/2004

OTHER PUBLICATIONS

Robert Aarts, Nokia: "Liberty ID-WSF Interaction Service Specification, version 1.0" Liberty Alliance Project, [Online] Nov. 12, 2003, pp. 1-33, XP002386488.
Introduction to the Liberty Alliance identity Architecture Passage. Revision 1 0. Introduction to the Liberty Alliance Identity Architecture. Mar. 2003. XP002903626.
Landau, S. Liberty ID-WSF Security and Privacy Ovewiew. Liberty Alliance Project. 2004, XP002308069.

* cited by examiner

*Primary Examiner* — Brandon Hoffman

(57) ABSTRACT

The present invention is aimed to provide a mechanism whereby any person can have user's attributes in a web service provider for sharing with a web service consumer, even if such person is not enabled to provide user's consent to share such user's attributes, and provided that other persons at a hierarchically higher position are enabled to provide such user's consent instead of the owner of the user's attributes, whilst respecting high requirements on privacy for both. Therefore, the present invention provides for a number of cooperating entities and a new method, the cooperating entities being configurable in such manner that delegation modules comprising different relationships of user's consent may be distributed among some of the cooperating entities, and transmitted between the number of cooperating entities, depending on the required level of privacy set on a per network basis and on a per user basis.

23 Claims, 8 Drawing Sheets

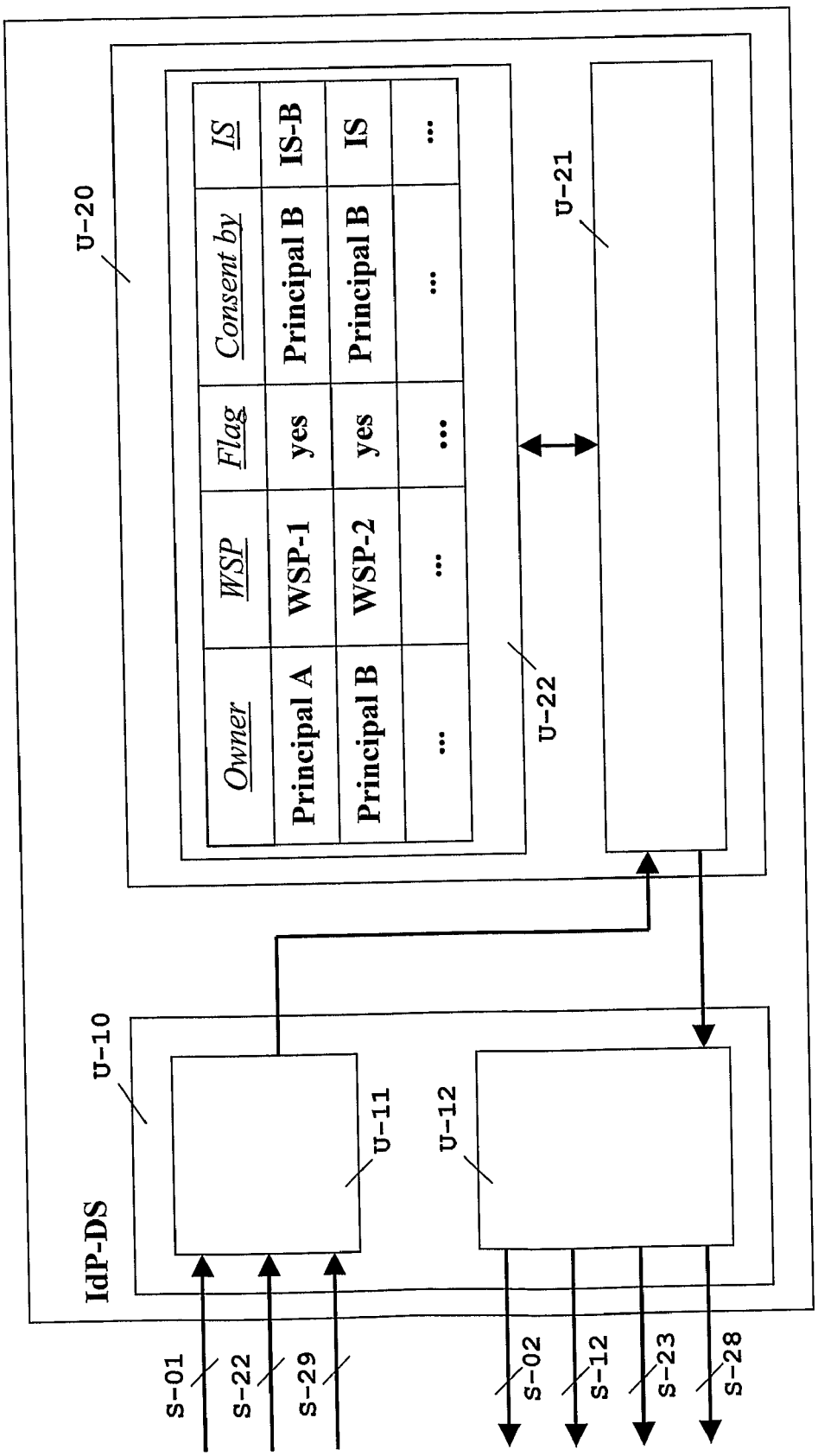
FIG.-1-

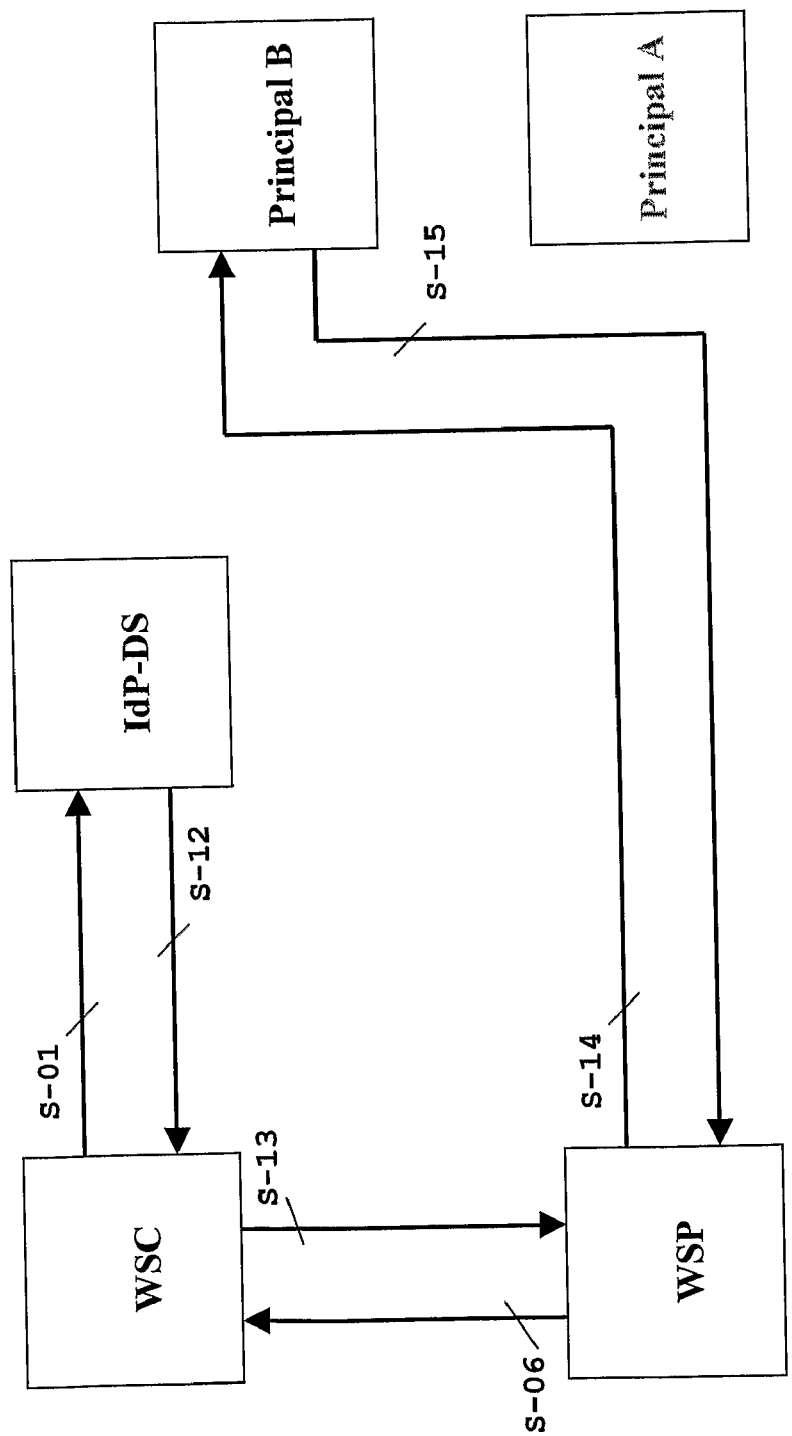
FIG.-2-

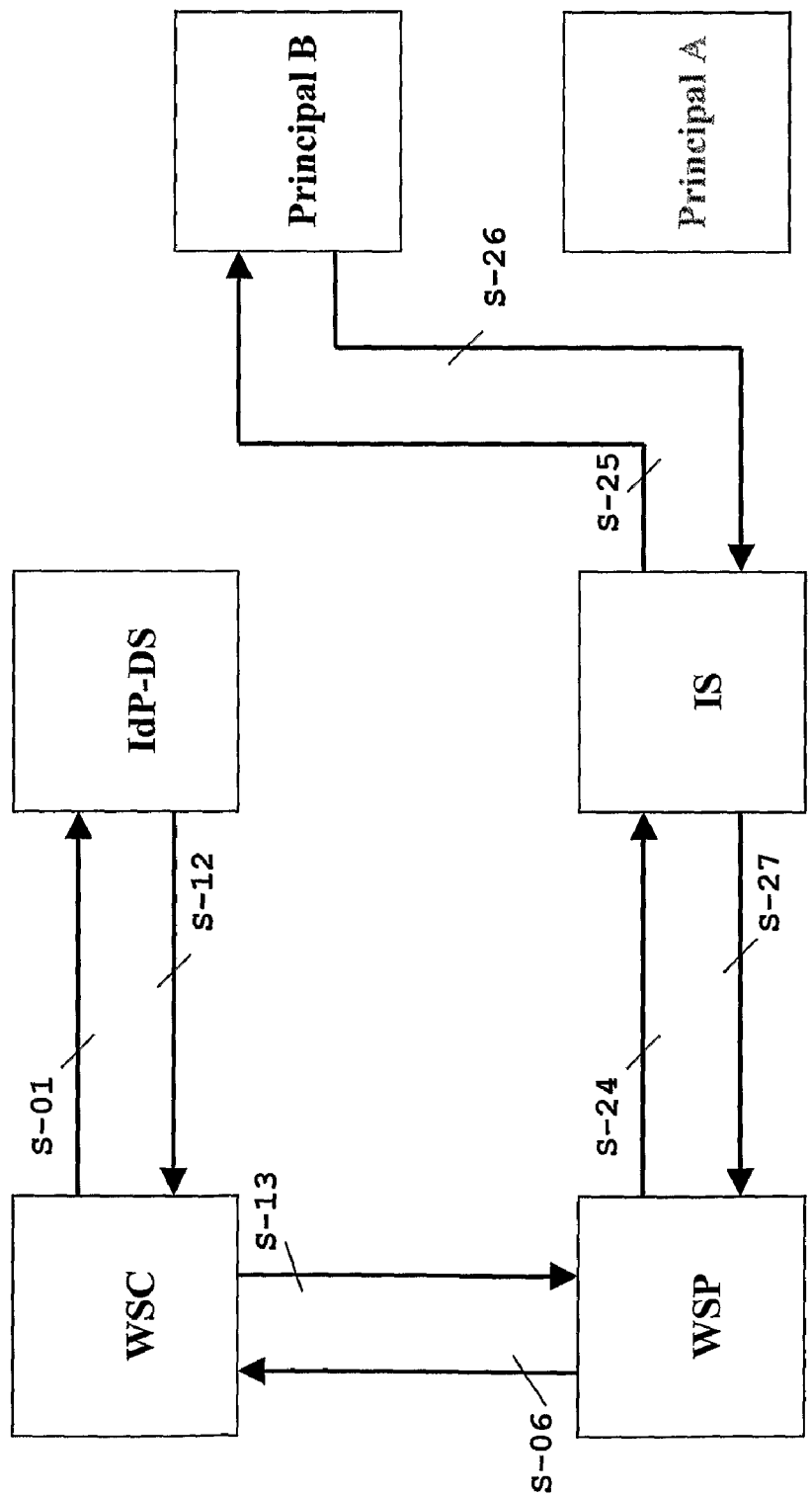
FIG.-3-

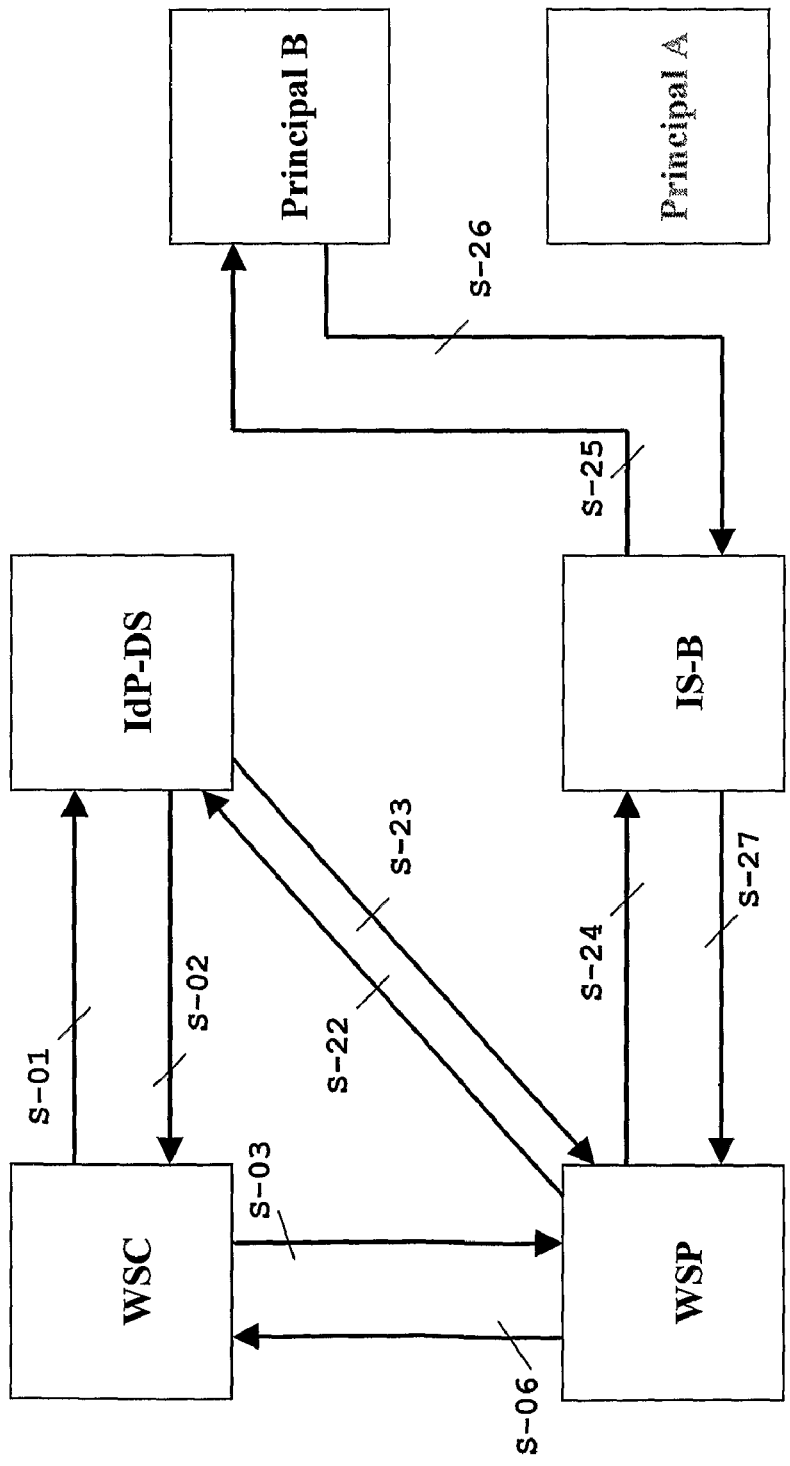
FIG.-4-

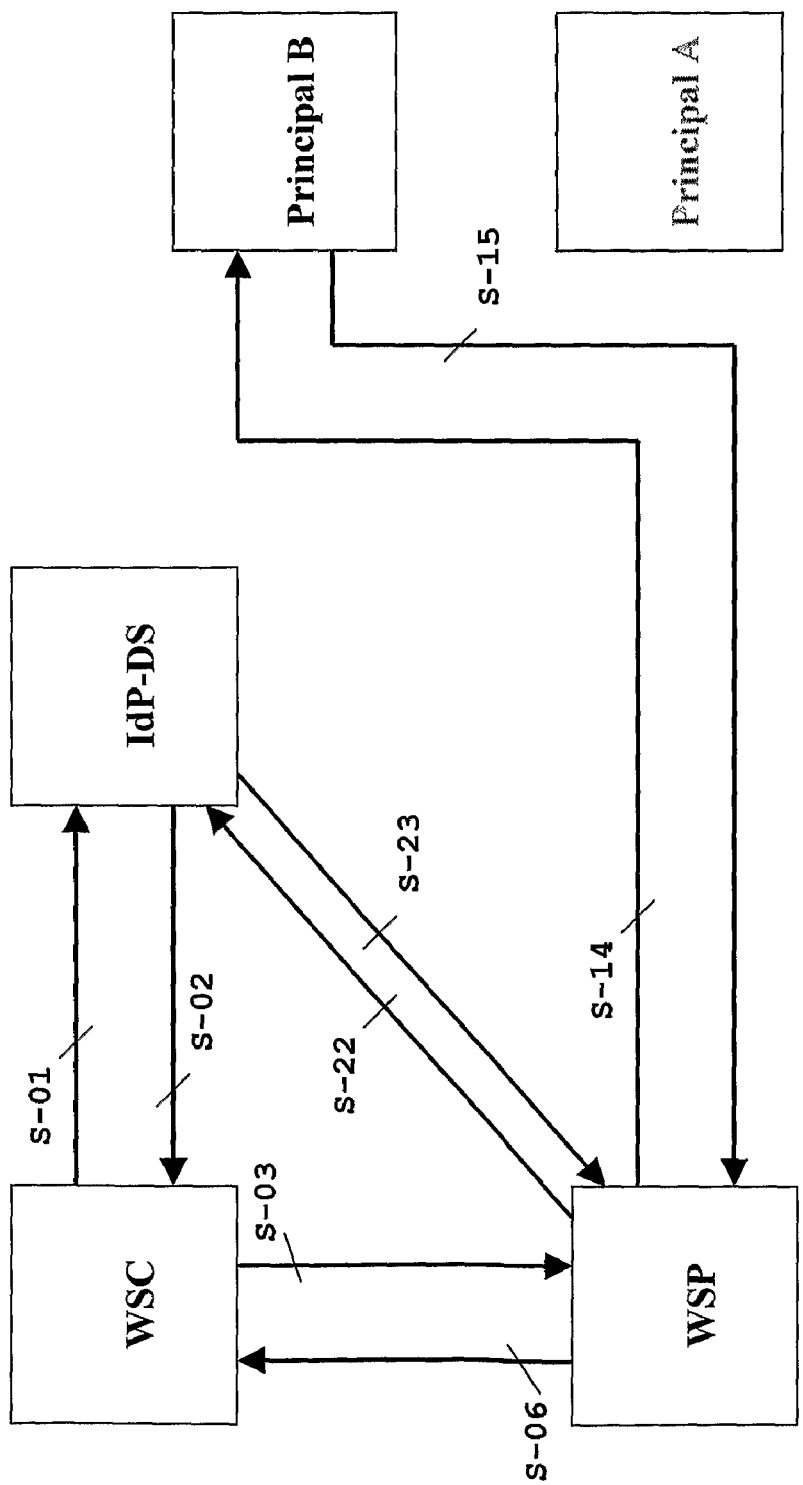
FIG.-5-

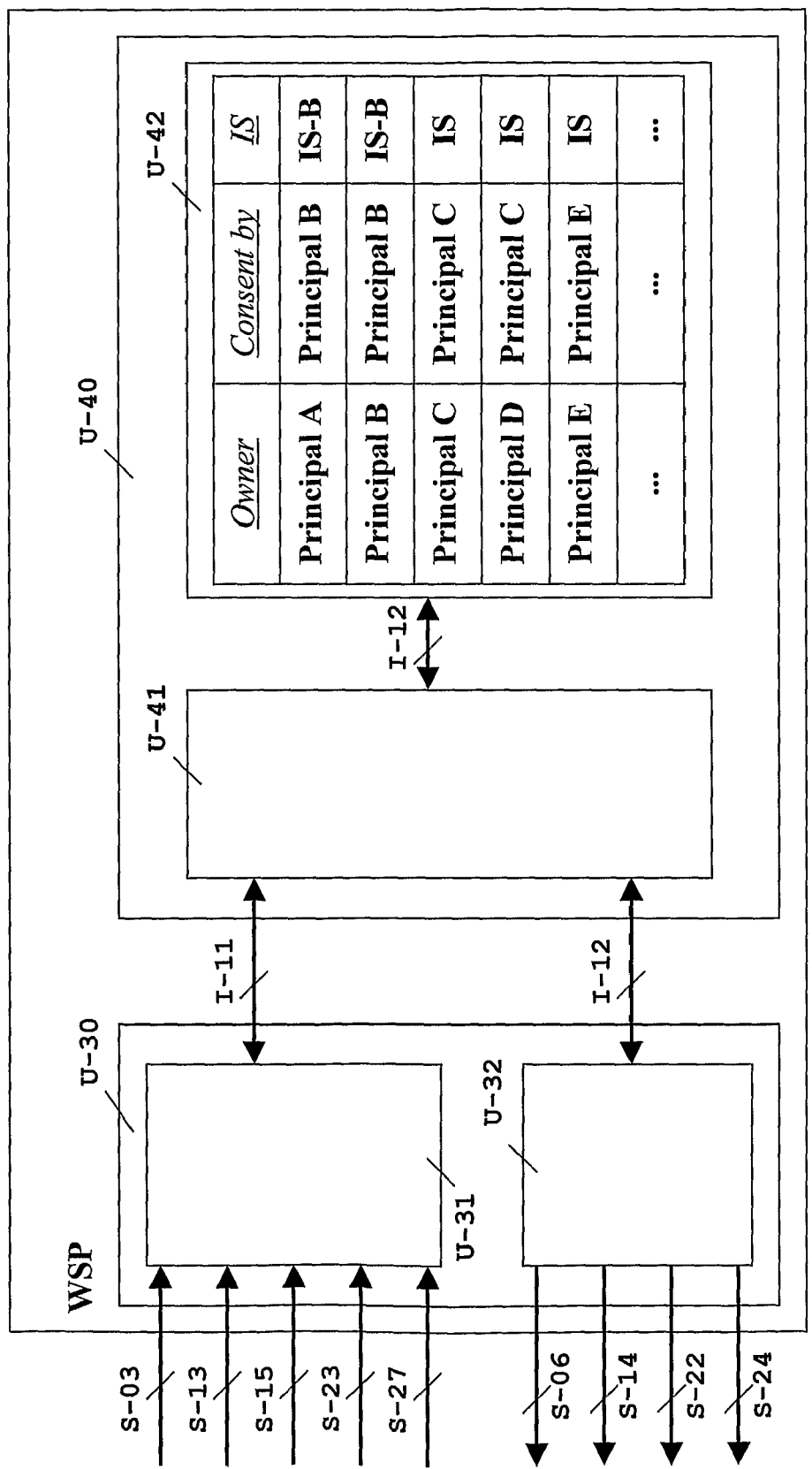
FIG.-6-

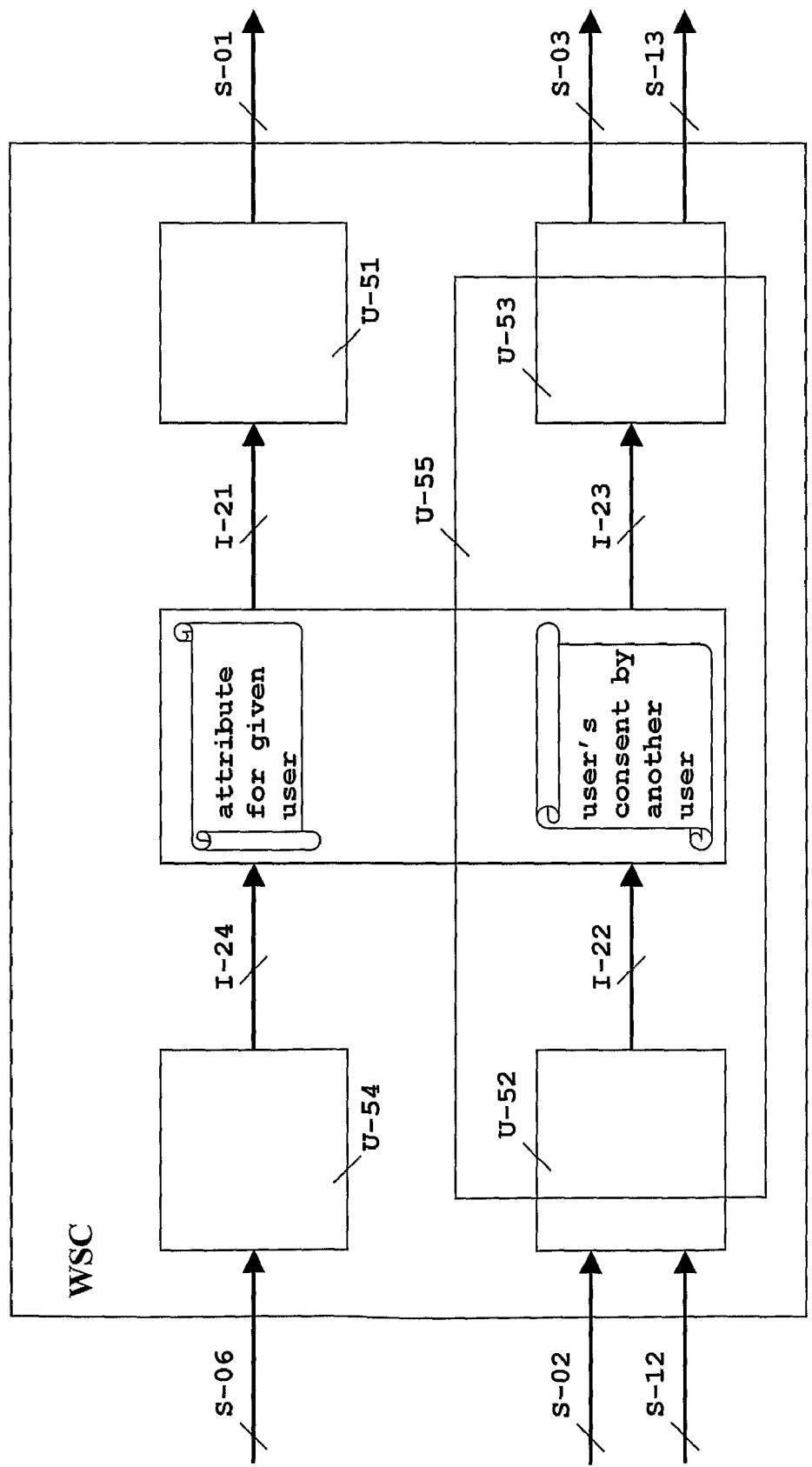
FIG.-7-

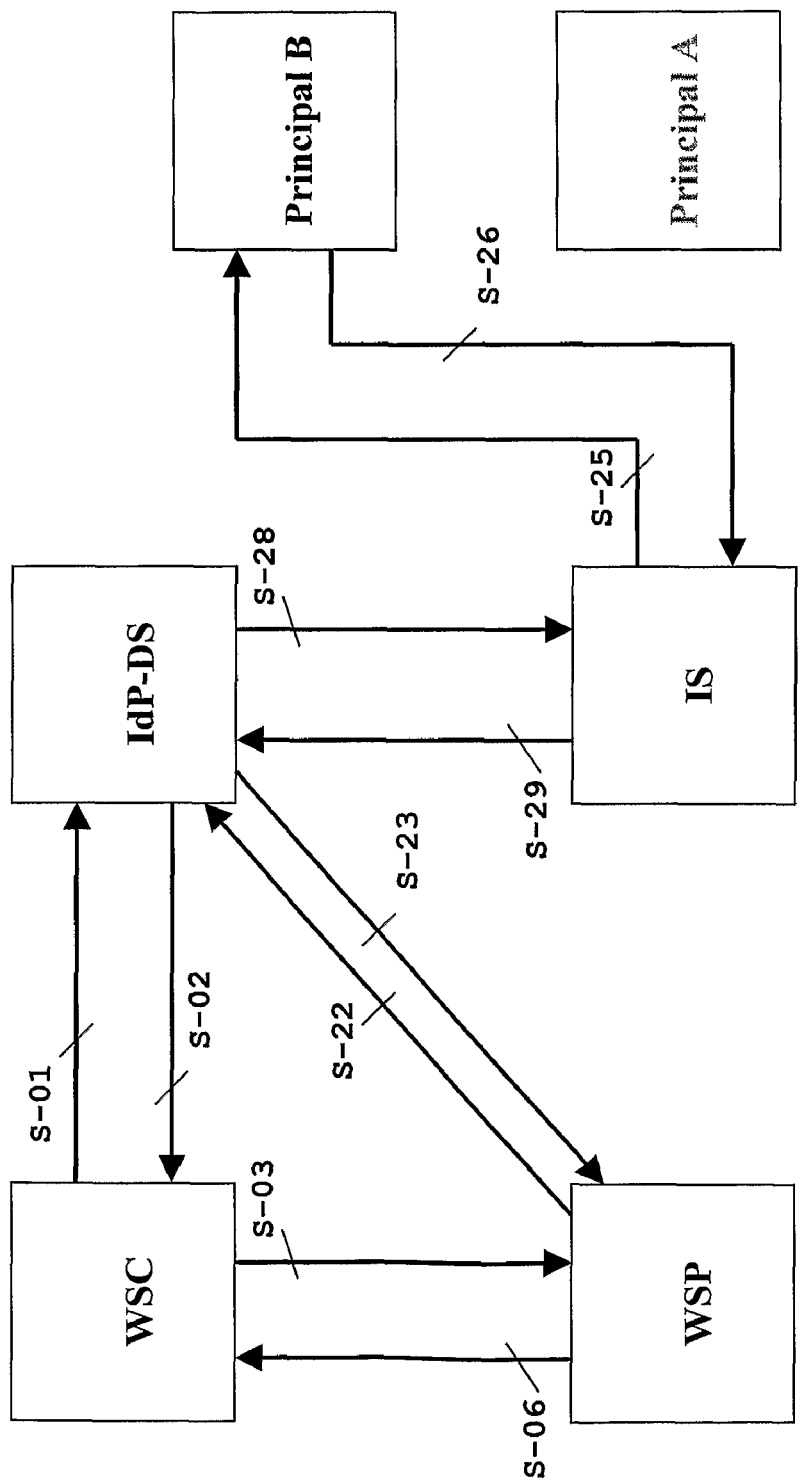
FIG.-8-

DELEGATION OF USER'S CONSENT IN FEDERATION OF SERVICES AND IDENTITY PROVIDERS

FIELD OF THE INVENTION

The present invention generally relates to the sharing of user's attributes among a plurality of service providers. More particularly, the invention is pertaining to method and apparatus for delegating user's consent to share user's attributes from a principal owning the attributes to another principal.

BACKGROUND

Liberty Alliance Project (hereinafter LAP) is aimed to develop a set of open technical specifications for web services. In this respect, LAP attempts to improve the use of web services by proposing a so-called Identity Web Services Framework (hereinafter Id-WSF) specifying the basis for privacy and security protection and, more specifically, LAP promotes and defines the Id-WSF for a permission-based attribute sharing.

Therefore, LAP distinguishes two classes of policies for carrying out said permission-based attribute sharing: policies established by the LAP processing components, namely component entities within the circle of trust, and policies established by individual Principals, namely the users. Other policies may be settled as well in accordance with applicable legislation. In short, LAP supports the sharing of user's attributes inasmuch as the user so permits.

Prior to discussing any existing techniques or trends to improve the use of web services by sharing users' attributes, the concept and scope of such users' attributes for LAP has to be clarified. On the one hand, an Attribute is understood under LAP as a distinct characteristic of a Principal, thus Principal's characteristics are said to describe the Principal. This definition of attribute made by Liberty harmonizes with the aim of a user's attribute as recited throughout this document, as well as with general interpretations made by the public, such as an attribute being a quality regarded as a natural or typical part of somebody or something, and also an attribute being an object recognized as a symbol of a person, or his position, or other personal details.

On the other hand, LAP goes beyond the attribute scope and introduces the concept of 'Resource' as either data related to some identity, or service acting on behalf of some identity; the former being a user's attribute in its most classical meaning, such as the user's postal address for example; the latter being a sort of abstraction derived from currently emerging services and facilities that may also characterize a user in interaction with other users, such as a user's calendar where user's appointments may interact with corresponding other-user's appointments. In particular, a user's calendar might be regarded as an exemplary user's attribute interesting to share with other users, for example, simply for appointment purposes, or for more sophisticated services such as the user booking at any time for dinner in a restaurant, and the restaurant making an appointment in the user's calendar as a confirmation of the booking later on. The user's attributes in the present document assume the distinction made by LAP and thus include a sort of identity-related attributes and a sort of service-related attributes for a particular user.

Currently existing techniques under LAP Id-WSF provide for a Discovery Service where each service provider, which hosts user's attributes, registers a sort of reference to the attributes, namely a so-called resource offering, and from where other service providers fetch such resource offering for further accessing the attribute. In particular, LAP designates the service provider carrying out the registration of a resource offering, and thus owning the attribute to be shared, as 'attribute provider' whereas any service provider fetching such resource offering is designated as 'attribute requestor'. Nevertheless, currently existing literature also refers to an 'attribute provider' as a web service provider, whereas an 'attribute requestor' is referred to as a web service consumer.

In accordance with LAP Id-WSF proposals, a web service consumer wanting to access a user's attribute of a given user requests a corresponding resource offering from a Discovery Service. The Discovery Service provides the corresponding resource offering, which includes a reference to a web service provider hosting the user's attribute, to the web service consumer, which in turn addresses a corresponding query to the web service provider about the user's attribute fetched of the given user.

Upon such request from a web service consumer, the web service provider may, for the sake of security and privacy, initiate a procedure to ask for user's consent from the given user prior to sharing the requested use's attribute with the web service consumer, namely the attribute requestor.

This procedure may perfectly satisfy a quite general scenario where users enjoy of different web services and get advantages of new services that facilitate the user's way of life, such as the above examples showing the sharing of the user's calendar, booking in a restaurant, getting last minute flight tickets depending on the availability of the user shown in the user's calendar, and so on.

However, further scenarios are foreseeable where user's consent by the user owning the attributes may be a drawback rather than an advantage. For example, where the user whose user's attributes are requested for sharing is actually a minor, or a person with handicapped control capability, both requiring a sort of parental or tutorial control in their normal way of living.

One might think that this problem would never occur if no user's attribute is published with a resource offering for such people without a full decision capability, but such restriction might be even worse. The current way of life, and the natural evolution and trends suggest that more and more services are going to be incorporated into the normal people life in the form of interactive web services. For instance, medical services anywhere may require accessing to personal details of a minor, on vacation without parents or relatives, and who may require an urgent treatment. Such personal details would be hosted in a web service provider but the sharing of these particular data should be subject of approval by the parents.

Thereby, any person has the right, and should be given the opportunity, to have user's attributes in a web service provider for sharing with an 'attribute requestor', namely with a web service consumer, even if such person is not enabled to provide user's consent to share such user's attributes.

Another scenario where the sharing of attributes may require user's consent by a user different than the one owning the user's attributes is a corporation having a designated employee as the user in charge of approving subscriptions of other employees to specific web service providers.

SUMMARY OF THE INVENTION

Therefore, an object of the present invention is the provision of a mechanism whereby any person can have user's attributes in a web service provider for sharing with a web service consumer, even if such person is not enabled to provide user's consent to share such user's attributes, and provided that other persons at a hierarchically higher position, such as parents, tutors, designated employees, or the like, are enabled to provide such user's consent instead of the owner of the user's attributes.

Moreover, the present invention is also aimed to provide a solution whereby privacy of both users, the one who gives user's consent and the one owning the attributes to be shared, is highly safeguarded.

A further object of the present invention is the provision of a solution that can be configurable in order to allow different levels of privacy safeguard, whilst still maintaining up to a reasonable number the entities to be upgraded with the new features provided for in accordance with the invention.

The above objects are accomplished in accordance with the present invention by the provision of a new method and a number of entities, they all cooperating to carry out different embodiments for the invention.

In accordance with a first aspect of the present invention, there is provided a new device for carrying out a Discovery Service, device which is called Discovery Service device in the instant specification. This Discovery Service device is suitable for holding a resource offering associated with an attribute of a given user and for providing the resource offering to a web service consumer server that wants to share such attribute. The attribute is available at a web service provider server and the resource offering comprises a reference to address the web service provider server where the attribute is hosted.

The Discovery Service device, in accordance with the invention, comprises: an input unit for receiving a query from the web service consumer server asking for a resource offering; an output unit for providing the resource offering to the web service consumer server; and a processing unit for determining whether user's consent by a second user, other than the given user owning the attribute, is required before obtaining the attributes of the given user from the web service provider server.

Different embodiments are provided depending on the level of privacy required. In this respect, there may be a certain level of privacy required by the network, namely within the circle of trust; and there may be different levels of privacy required by different users.

Thus, the Discovery Service device may be configured so that the output unit includes means for providing an indication on that user's consent by a second user other than the given user is required. Moreover, if the required levels of privacy allow for it, the Discovery Service device may be configured so that the output unit also includes means for providing an identifier of the second user to ask for user's consent, who is other than the given user, to the web service consumer server.

The Discovery Service device may as well be configured so that the input unit includes means for receiving a request from the web service provider server for an identifier of the second user to ask for user's consent, who is other than the given user; whereas the output unit includes means for providing the identifier to the web service provider server.

On the other hand, where the level of privacy precludes the sending of information related to the user's consent through the web service consumer, the Discovery Service device may be configured so that the output unit comprises means for providing a resource offering of an Interaction Service. The Interaction Service being an intermediate entity that allows interactions between a client, like a web service provider is, and a user. The Interaction Service is thus used to ask for the user's consent.

In accordance with other aspect of the present invention, there is provided a new server implementing the functionality of a web service provider, namely a web service provider server suitable for acting as an attribute provider for attributes of a given user upon request from a web service consumer server acting as an attribute requestor.

This web service provider server, in accordance with the invention, comprises: an input unit for receiving a request from the web service consumer server for an attribute of the given user; an output unit for providing the requested attribute of the given user to the web service consumer server; and a processing unit for determining, in cooperation with the input and output units, whether user's consent by a second user, other than the given user, is required before providing the attributes of the given user to the web service consumer server.

If the requirements on privacy so permit, the web service provider server may be configured so that the input unit includes means for receiving an indication on that user's consent by a second user other than the given user is required.

Nevertheless, and at least for some users with higher privacy requirements, the web service provider server may be configured as well so that the output unit includes means for requesting an identifier of the second user to ask for user's consent, who is other than the given user, to a Discovery Service device; and the input unit includes means for receiving the requested identifier from the Discovery Service device.

Of course, if the requirement of privacy allows for it, the web service provider server may be configured so that the input unit includes means for receiving an identifier of the second user to ask for user's consent, who is other than the given user, from the web service consumer server, which has simply transmitted this information as received from the Discovery Service device.

Aligned with a previous embodiment cited from the perspective of the Discovery Service device, the web service provider server may be configured in such manner that the input unit comprises means for receiving a resource offering of an Interaction Service to allow interactions with the second user, who is other than the given user, to ask for the user's consent.

In accordance with a further aspect of the present invention, there is provided a new server implementing the functionality of a web service consumer, namely a web service consumer server suitable for acting as an attribute requestor for attributes of a given user available at a web service provider server, the latter acting as an attribute provider.

This web service consumer server comprises: a first output unit for sending a query to a Discovery Service device asking for a resource offering associated with an attribute of a given user, the resource offering comprising a reference to address the web service provider server; a first input unit for receiving the resource offering from the Discovery Service device; a second output unit for sending a request to the web service provider server for an attribute of the given user; and a second input unit for receiving the requested attribute of the given user from the web service provider server. In accordance with the invention, the first input unit of this web service consumer server includes means for receiving an indication from the Discovery Service device on that user's consent by a second user other than the given user is required; and the second output unit of this web service consumer server includes means for sending the indication on that user's consent by a second user other than the given user is required towards the web service provider server.

Aligned with advantageous behaviors of the above entities, and where the requirement on privacy for at least the involved users so permit, the web service consumer server may be configured so that the first input unit includes means for receiving an identifier of the second user to ask for user's consent, who is other than the given user, from the Discovery Service device; and the second output unit includes means for sending the identifier of the second user to ask for user's consent, who is other than the given user, to the web service provider server.

On the other hand, when the requirements on privacy are higher and also aligned with advantages derived from the necessary cooperation with the Discovery Service device and with the web service provider server, the web service consumer server may be configured so that the first input unit includes means for receiving from the Discovery Service device a resource offering of an Interaction Service to allow interactions between a client and a user to ask for the user's consent; and the second output unit includes means for sending the resource offering of the Interaction Service to the web service provider server.

In accordance with a still further aspect of the present invention, there is provided a new service entity, namely an Interaction Service for allowing a service provider to ask questions, such as asking for user's consent, to an indicated user.

This Interaction Service, in accordance with the invention comprises: means for receiving a query from a querying entity asking for user's consent by an indicated user, to share user's attributes of a given user; means for obtaining the user's consent to share user's attributes of a given user; means for determining that user's consent by a second user other than the given is required; and means for providing the user's consent obtained from the second user towards the querying entity. This Interaction Service may operate more advantageously when arranged with means for transmitting towards the second user, whose user's consent is asked for, information identifying the given user whose user's attributes are asked for consent to be shared.

Apart from the co-operating entities, namely the Discovery Service device, the web service provider server, the web service consumer server and the Interaction Service, there is also provided a method for delegating user's consent to share an attribute of a given user to a second user other than the given user. The attribute is available at a web service provider server, which acts as an attribute provider, for being shared with at least one web service consumer server, which acts as an attribute requestor.

This method includes: a step of registering a resource offering associated with an attribute of a given user at a Discovery Service device, the resource offering comprising a reference to address the web service provider server; a step of querying the Discovery Service device from the web service consumer server to ask for the resource offering; a step of providing the resource offering to the web service consumer server; a step of requesting from the web service consumer server to the web service provider server the attribute of the given user; a step of receiving at the web service consumer server the requested attribute of the given user from the web service provider server; a step of indicating to the web service provider server that user's consent by a second user other than the given user is required; and a step of asking for user's consent to the required second user other than the given user.

When the requirements on privacy so allow, the method may further comprise a step of obtaining an identifier of the second user to ask for user's consent, who is other than the given user, at the web service provider server. In this case, the step of obtaining the identifier of the second user to ask for user's consent may include a step of receiving the identifier of the second user to ask for user's consent from the web service consumer server. Moreover, the step of obtaining the identifier of the second user to ask for user's consent may include a step of requesting the identifier of the second user to ask for user's consent, who is other than the given user, to a Discovery Service device.

On the other hand, and aligned with corresponding capabilities of the above entities, the method may further comprise a step of receiving a resource offering of an Interaction Service that allows interactions between the web service provider server and the second user, who is other than the given user, to ask for the user's consent.

BRIEF DESCRIPTION OF DRAWINGS

The features, objects and advantages of the invention will become apparent by reading this description in conjunction with the accompanying drawings, in which:

FIG. 1 is a basic block diagram illustrating a Discovery Service device arranged in accordance with some embodiments of the invention with structural means for determining whether user's consent by a second user is required before sharing user's attributes of a given user.

FIG. 2 illustrates the cooperating entities and signalling exchanged to carry out an embodiment of the invention where most of the relevant data, regarding user's consent by another user, may be either provided from a Discovery Service device, or known in advance by a web service provider server, and wherein the user to give user's consent is directly reachable.

FIG. 3 illustrates a similar architecture as shown in FIG. 2, wherein the user to give user's consent is only reachable through an Interaction Service, which may be equipped with means to determine that user's consent is required by a second user, rather than by the given user owning user's attributes to be shared.

FIG. 4 illustrates a similar architecture as shown in FIG. 3, wherein relevant data, regarding user's consent by another user, may be either provided from a Discovery Service device to a web service provider server upon request, or known in advance by an Interaction Service.

FIG. 5 illustrates a similar architecture as shown in FIG. 4, wherein the user to give user's consent is directly reachable and wherein relevant data, regarding user's consent by another user, may be directly provided from a Discovery Service device to a web service provider server upon request.

FIG. 6 is a basic block diagram illustrating a web service provider server arranged in accordance with some embodiments of the invention with structural means for determining whether user's consent by a second user is required before sharing user's attributes of a given user.

FIG. 7 is a basic block diagram illustrating a web service consumer server arranged in accordance with some embodiments of the invention with structural means for receiving an indication on that user's consent by a second user, other than the one owning the user's attributes, is required; and with structural means for sending this indication.

FIG. 8 illustrates a similar architecture as shown in FIG. 4, wherein relevant data, regarding user's consent by another user, may be provided from a Discovery Service device to a web service provider server upon request, irrespective on whether these relevant data known in advance by the Discovery Service device or by an Interaction Service.

DETAILED DESCRIPTION OF PREFERRED EMBODIMENTS

The following describes some preferred embodiments for providing a mechanism whereby a user's consent to share user's attributes is given by a user other than the one owning the user's attributes.

An important contribution behind the present invention is that dependencies on the approval between different users, namely different Principals in the wording of LAP, are firstly determined by an entity playing the role of a Discovery Service.

Such an entity is called Discovery Service device (IdP-DS) in the instant specification and carries out the functionality of a Discovery Service for resource offerings within a given circle of trust. The role of a Discovery Service is generally played by a so-called identity provider, namely the operator network where the user has a subscription. A circle of trust is, for the purpose of the present invention, a contract or agreement set by a number of web service providers and at least one identity provider whereby users with a subscription held by the identity provider can make use of services offered by the web service providers, that is, users can make use of services within a so-called federation.

In accordance with a first aspect of the present invention illustrated in FIG. 2 to FIG. 6, a web service consumer (WSC), which is acting on behalf of a principal not shown in any diagram, issues a query (S-01) towards a Discovery Service device (IdP-DS) in order to discover attributes of a given type. When the Discovery Service device (IdP-DS) receives (S-01) the query from the web service consumer (WSC), such as for example a DS Lookup Query request intended for getting the location and credentials for a certain resource, the Discovery Service device (IdP-DS) evaluates approval dependencies against the qualification of the web service consumer (WSC) requesting the operation. This certain resource being associated with a user's attribute of a given user (Principal A).

Therefore, as FIG. 1 illustrates, the Discovery Service device (IdP-DS) comprises an input unit (U-11) with means for receiving the request from the web service consumer, and a processing unit (U-20) for determining whether user's consent by a second user (Principal B), who is other than the given user (Principal A), is required before obtaining the attributes of the given user (Principal A) from a web service provider server (WSP). If the Discovery Service device (IdP-DS) determines, as a result of this evaluation, that accesses to the user's attribute by this web service consumer (WSC) require a user's consent, and that said user's consent has to be provided not by the resource owner (Principal A) but by another user (Principal B), different embodiments turn up to force the web service provider hosting the user's attribute to obtain user's consent by the user (Principal B) in charge of approval for user's attribute sharing for the given user (Principal A). In accordance with a first embodiment of the invention illustrated in FIG. 4 and FIG. 5, the Discovery Service device (IdP-DS) includes within an authorisation assertion, sent back (S-02) for example in a DS Lookup Response towards the querying web service consumer (WSC), not only the resource offering of the web service provider (WSP) hosting the user's attribute, as nowadays, but also a flag indicating that user's consent is needed before providing the attribute. Such indication further forces the web service provider (WSP) to ask for user's consent when receiving (S-03) an Attribute Query containing this assertion.

In particular, the resource offering currently defined by LAP already includes a reference to address the web service provider hosting the user's attribute. Therefore, as FIG. 1 illustrates, the Discovery Service device (IdP-DS) is provided with an output unit (U-12) for providing (S-02) the resource offering to the web service consumer (WSC). The input unit (U-11) and the output unit (U-12) may be provided as an integral input/output unit (U-10) comprising means for receiving a query (S-01) asking for a resource offering from the web service consumer (WSC), and means for providing (S-02; S-12) the resource offering to said web service consumer (WSC). In an embodiment shown in FIG. 1, the processing unit (U-20) of a the Discovery Service device (IdP-DS) may comprise a logic control unit (U-21) for processing all the relevant data related to a given resource offering, and a delegation module (U-22) for the relevant data, such as the given user (Principal A) owning the user's attribute to be shared, the reference to the web service provider (WSP-1) hosting the user's attribute, the flag ("yes") indicating that user's consent is needed before providing the attribute, and even an identifier of the second user (Principal B) in charge of the user's consent.

Given that the above flag, which indicates that user's consent is needed before providing the attribute, may be included in the authorisation assertion returned (S-02; S-12) from the Discovery Service device (IdP-DS), the web service consumer is provided, in a configurable architecture under this embodiment, with means (U-55; U-52, I-22) for receiving the flag from the Discovery Service device (IdP-DS) and means (U-55; I-23, U-53) for sending the flag towards the web service provider (WSP), as FIG. 7 illustrates. Moreover, a distinction may be made on the flag value, so that it may further distinguish whether the user's consent is required by the given user (Principal A) owning the attribute to be shared, or by a second user (Principal B).

In this embodiment illustrated in FIG. 4 and FIG. 5, the web service consumer (WSC) receiving (S-02) the authorisation assertion issues a request (S-03), such as for example a so-called Attribute Query, to the web service provider (WSP) where the attribute is hosted, and which reference (WSP-1) is received as part of the resource offering. Upon reception of such request (S-03), as it contains an assertion with the user's consent flag ("yes"), the web service provider (WSP) newly issues (S-22) a query towards the Discovery Service device (IdP-DS), for example with the so-called DS Lookup Query, to obtain information about the user (Principal A, Principal B) who should give user's consent to share attributes of a given user (Principal A). Given that the flag indicating user's consent may, depending on configurable capabilities, simply indicate that user's consent is required, or may further indicate that the user's consent is required by a different user (Principal B) than the one (Principal A) owning the attribute to be shared, the query (S-22) triggered from the web service provider (WSP) towards the Discovery Service device (IdP-DS) might also include different information.

Irrespective of the information received at the Discovery Service device (IdP-DS) from the web service provider (WSP), but rather depending on architectural provisions in the circle of trust, the present invention provides for different answers from the Discovery Service device (IdP-DS). Therefore, two different sub-embodiments turn up for the Discovery Service device (IdP-DS) to provide the requested information.

In a first sub-embodiment illustrated in FIG. 4, the Discovery Service device (IdP-DS) answers (S-23) to the web service provider (WSP) with a resource offering of an Interaction Service (IS) for allowing any service provider (WSP) to ask simple questions to users (Principal A; Principal B), such as a request for user's consent may be. Under this sub-embodiment, different configurable alternatives may be provided for in accordance with the present invention.

On the one hand, and given that the Discovery Service device (IdP-DS) has means (U-20) for determining whether user's consent by a second user (Principal B) other than the given user (Principal A) is required, the Discovery Service device (IdP-DS) may provide (S-23) a resource offering of an Interaction Service (IS-B) in charge of communicating with said second user (Principal B).

On the other hand, and even if the Discovery Service device (IdP-DS) knows that a second user is responsible for the user's consent instead of the given user, the Discovery Service device (IdP-DS) may provide (S-23) a resource offering of an Interaction Service (IS) in charge of approval delegations between users without any indication towards the web service provider about who is the user responsible for user's consent. In this latter configurable alternative, the Interaction Service (IS) is provided with a delegation mapping which can be used to address any query for user's consent by a given user (Principal A) towards a second user (Principal B) who is responsible for such user's consent. This second approach is preferred for a scenario where user's privacy is of the utmost importance and where the web service provider should by no means be aware of any relation about users regarding the user's consent to share user's attributes.

Upon reception (S-23) at the web service provider (WSP) of the resource offering of the Interaction Service (IS; IS-B), and depending on whether the user's consent by the second user (Principal B) is indicated or hidden, the web service provider sends (S-24) a query to the given Interaction Service (IS) asking for user's consent by an indicated user (Principal A; Principal B). Provided that the Interaction Service (IS) is configured with a delegation mapping, and the given user (Principal A) is asked for user's consent, the Interaction Service (IS) determines that a second user (Principal B) is actually the one to give such user's consent, and forwards (S-25) the received query to said second user (Principal B). However, if a query for user's consent by the second user (Principal B) is explicitly asked from the web service provider (WSP), the Interaction Service (IS-B) simply forwards (S-25) the received query to said second user (Principal B). Upon reception (S-26) at the Interaction Service (IS; IS-B) of the user's consent by the second user (Principal B), such user's consent is forwarded (S-27) towards the requesting web service provider (WSP), which is now enabled to provide (S-06) the originally requested user attributes of the given user (Principal A) to the attribute requestor, namely to the web service consumer (WSC).

In a second sub-embodiment illustrated in FIG. 5, the Discovery Service device (IdP-DS) answers (S-23) to the web service provider (WSP) with a reference directly addressing the second user (Principal B) whose user's consent is required for sharing user's attributes of the given user (Principal A). Upon reception (S-23) of this indication at the web service provider (WSP) the user's consent by the second user (Principal B) is retrieved (S-14, S-15), and the originally requested user attributes of the given user (Principal A) are provided (S-06) towards the attribute requestor, namely to the web service consumer (WSC).

Therefore, as illustrated in FIG. 6, the web service provider (WSP) has a server comprising an input unit (U-31) with means for receiving (S-03) a request from the web service consumer (WSC) asking for a user's attribute of a given user (Principal A), a processing unit (U-40) for determining in cooperation with the input unit (U-31) and with an output unit (U-32) whether user's consent by a second user (Principal B), who is other than the given user (Principal A), is required before obtaining the attributes of the given user (Principal A), and the output unit (U-32) for providing the requested attribute to the web service consumer (WSC). In this respect, the input unit (U-31) may also include means for receiving a flag indicating that user's consent by a second user (Principal B) is required. This flag may force a processing module (U-41) in the web service provider to determine from a mapping module (U-42) who is the user (Principal B) to give user's consent for a given user (Principal A).

Still with reference to FIG. 6, and valid for some embodiments of the present invention, all the information related with the second user (Principal B) may be received through the input unit (U-31), either directly or upon explicit request from the web service provider through the output unit (U-32), so that the processing unit (U-40) is in practice the processing module (U-41) without needs for the mapping module (U-42). In this respect, the output unit (U-32) is preferably equipped with means for requesting (S-22) an identifier of the second user towards the Discovery Service device (IdP-DS), and the input unit (U-31) is equipped with means for obtaining (S-23) such identifier from the Discovery Service device (IdP-DS). Alternatively, the input unit (U-31) may be equipped with means for receiving (S-23) resource offering of the Interaction Service (IS; IS-B). Moreover, the applicable Interaction Service (IS; IS-B) for contacting a user, either the given user (Principal A) or the second (Principal B) user whose user's consent is required, may be also obtainable from the mapping module (U-42) shown in FIG. 6, instead of being requested from the Discovery Service device (IdP-DS) as FIG. 4 illustrates.

In accordance with a second embodiment of the invention illustrated in FIG. 2 and FIG. 3, the Discovery Service device (IdP-DS) includes all the relevant information related with user's consent upon a query (S-01) from a web service consumer (WSC) about a resource offering, so that the web service provider may progress on its own without further querying the Discovery Service device (IdP-DS). Under this embodiment, the resource offering to be provided (S-12) from the Discovery Service device (IdP-DS), through the output unit (U-12) illustrated in FIG. 1, includes the flag ("yes") indicating whether the user's consent is required by the given user (Principal A) owning the attribute or by a second user (Principal B), a reference directly addressing the second user (Principal B) whose user's consent is required for sharing user's attributes of the given user (Principal A), and the reference to address the web service provider (WSP-1) hosting the user's attribute. Therefore, the Discovery Service device (IdP-DS) is equipped with the delegation module (U-22) as FIG. 1 illustrates.

Also under this embodiment, the Discovery Service device (IdP-DS) may include in the response (S-12) to the web service consumer (WSC), instead of a reference to directly address the second user (Principal B) whose user's consent is required, a reference to address an Interaction Service (IS) for further allowing the service provider (WSP) to ask for user's consent to an indicated second user (Principal B). The web service consumer (WSC) receives (S-12) the resource offering for attributes of the given user (Principal A), with or without the reference to the Interaction Service (IS), and includes the received data in the request (S-13) towards the web service provider (WSP) asking for a user's attribute of the given user (Principal A).

Therefore, two different sub-embodiments also turn up under this embodiment for the web service provider to obtain the user's consent depending on whether the reference to the Interaction Service (IS) is provided or not.

In a first sub-embodiment illustrated in FIG. 2, the web service provider (WSP) has received (S-13) a flag indicating that user's consent is required by a second user (Principal B) other than the given user whose attributes are requested, and a reference to directly address such second user. The web service provider, then, asks (S-14) for user's consent to the indicated second user (Principal B) and upon receiving (S-15) such user's consent, provides (S-06) the requested user's attribute of a given user (Principal A) to the attribute requestor, namely to the web service consumer (WSC).

In a second sub-embodiment illustrated in FIG. 3, the web service provider (WSP) receives (S-13), apart from the flag indicating that user's consent is required by a second user and an identifier of the second user (Principal B), a reference to address an Interaction Service (IS) for further allowing the service provider (WSP) to ask for user's consent. The web service provider, then, requests (S-24) the Interaction Service (IS) to obtain the user's consent by an indicated user (Principal A; Principal B).

Provided that the Interaction Service (IS) is configured with a delegation mapping, and the indicated user asked for user's consent is the given user (Principal A) owning the attribute, the Interaction Service (IS) determines that a second user (Principal B) is actually the one to give such user's consent, and forwards (S-25) the received query to said second user (Principal B). On the other hand, if the query for user's consent by the second user (Principal B) is explicitly asked (S-24) from the web service provider (WSP), the Interaction Service (IS-B) simply forwards (S-25) the received query to said second user (Principal B).

As for the previous embodiment illustrated in FIG. 4, also in this embodiment illustrated in FIG. 3, the Interaction Service (IS; IS-B) receiving (S-26) the user's consent by the second user (Principal B), forwards (S-27) such user's consent towards the requesting web service provider (WSP), which is now enabled to provide (S-06) the originally requested user attributes of the given user (Principal A) to the attribute requestor, namely to the web service consumer (WSC).

Apart from the two embodiments described above, each one with two sub-embodiments illustrated in FIG. 2 to FIG. 5, the present invention also provides for an alternative embodiment in this configurable system whereby the user's consent and the user in charge of giving such user's consent is only known by an Interaction Service (IS; IS-B) under the identity provider operator premises, and only obtained by the web service provider (WSP) from the Discovery Service device (IdP-DS). Therefore, either the Interaction Service (IS; IS-B) or the Discovery Service device (IdP-DS) is the only entity equipped with a delegation module (U-22) as the one exemplary illustrated in FIG. 1 only for the Discovery Service device (IdP-DS).

Under this embodiment illustrated in FIG. 8, the web service consumer (WSC) receives (S-02) a flag within the authorisation assertion indicating that user's consent is required and to be provided through the Discovery Service device (IdP-DS). The latter issues a request (S-03), such as the so-called Attribute Query, to the web service provider (WSP) where the attribute is hosted, and which reference (WSP-1) is received as part of the resource offering. Upon reception of such request (S-03), as it contains the assertion with said user's consent flag, the web service provider (WSP) newly issues (S-22) a query towards the Discovery Service device (IdP-DS), as exemplary cited above with the so-called DS Lookup Query, to obtain user's consent by the user (Principal A, Principal B) who should give it.

The Discovery Service device (IdP-DS), then, requests (S-28) the Interaction Service (IS) to obtain the user's consent by an indicated user (Principal A; Principal B). As above, provided that the Interaction Service (IS) is configured with the delegation mapping, and the indicated user asked for user's consent is the given user (Principal A) owning the attribute, the Interaction Service (IS) determines that a second user (Principal B) is actually the one to give such user's consent, and forwards (S-25) the received query to said second user (Principal B). On the other hand, if the query for user's consent by the second user (Principal B) is explicitly asked (S-28) from the Discovery Service device (IdP-DS), the Interaction Service (IS-B) simply forwards (S-25) the received query to said second user (Principal B). Afterwards, the Interaction Service (IS; IS-B) receiving (S-26) the user's consent by the second user (Principal B), returns (S-29) to the requesting Discovery Service device (IdP-DS), which in turn forwards (S-23) such user's consent towards the requesting web service provider (WSP), the latter being now enabled to provide (S-06) the originally requested user attributes of the given user (Principal A) to the web service consumer (WSC).

The invention thus provides for a number of configurable network entities co-operating to provide a mechanism for delegating user's consent between different users with different degrees of privacy in respect of the user's data that may be known by each of said network entities. Moreover, the mapping modules may be built up and distributed between the different network entities in such a manner that different users get different levels of privacy, depending on their own wishes and needs, the different levels of privacy being measured in terms of which entities within the circle of trust are enabled to receive or to be aware of the delegation of user's consent for certain users.

The different level of privacy for each user may be established on a per user basis in the Discovery Service device (IdP-DS) so that the initial query (S-01) for a resource offering may be answered with different parameters depending on the required level of privacy for the given user. The different parameters provided back from the Discovery Service device (IdP-DS) towards the web service consumer (WSC) trigger, in accordance with the invention, the different embodiments described hereinbefore that, at the end, provide the users with different level of privacy on its delegation relationships.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A Discovery Service device (IdP-DS) suitable for holding a resource offering associated with an attribute of a given user and for providing the resource offering to a web service consumer server (WSC), the attribute being available at a web service provider server (WSP) and the resource offering comprising a reference to address the web service provider server, the Discovery Service device comprising:
    an input unit for receiving a query from the web service consumer server asking for a resource offering; and
    an output unit for providing the resource offering to the web service consumer server; and
    a processing unit for determining that user's consent by a second user other than the given user is required before obtaining the attributes of the given user from the web service provider server;
    the output unit including means for providing towards the web service consumer server an indication on that user's consent by a second user other than the given user is required; and
    the output unit comprises means for providing a resource offering of an Interaction Service being an intermediate entity that allows interactions between the WSP and the second user to ask for the user's consent.

2. The Discovery Service device of claim 1, further comprising a delegation module with an identifier of the second user in charge of the user's consent.

3. The Discovery Service device of claim 2, wherein:
the input unit includes means for receiving a request from the web service provider server for an identifier of the second user to ask for user's consent, who is other than the given user; and
the output unit includes means for providing the identifier of the second user to the web service provider server.

4. The Discovery Service device of claim 2, wherein the output unit includes means for providing an identifier of the second user to ask for user's consent, who is other than the given user, to the web service consumer server.

5. The Discovery Service device of claim 1, wherein:
the given user is not enabled to provide their consent to share the attributes; and
the second user is enabled to provide consent instead of the given user to share the attributes.

6. A web service provider server (WSP) suitable for acting as an attribute provider for attributes of a given user upon request from a web service consumer server (WSC) acting as an attribute requestor, the web service provider server having:
an input unit for receiving a request from the web service consumer server for an attribute of the given user; and
an output unit for providing the requested attribute of the given user to the web service consumer server;
the input unit includes means for receiving from the web service consumer server an indication on that user's consent by a second user other than the given user is required; and
a processing unit for determining an identifier of the second user to give user's consent for the given user.

7. The web service provider server of claim 6, further comprising a mapping module for determining the identifier of the second user to give user's consent.

8. The web service provider server of claim 6, wherein:
the output unit includes means for requesting an identifier of the second user to ask for user's consent, who is other than the given user, to a Discovery Service device (Id-PDS); and
the input unit includes means for receiving the identifier from the Discovery Service device.

9. The web service provider server of claim 6, wherein the input unit includes means for receiving an identifier of the second user to ask for user's consent, who is other than the given user, from the web service consumer server.

10. The web service provider server of claim 6, wherein the input unit comprises means for receiving a resource offering of an Interaction Service that allows interactions between the web service provider server and the second user, who is other than the given user, to ask for the user's consent.

11. The web service provider server of claim 6, wherein:
the given user is not enabled to provide their consent to share the attributes; and
the second user is enabled to provide consent instead of the given user to share the attributes.

12. A web service consumer server (WSC) suitable for acting as an attribute requestor for attributes of a given user available at a web service provider server (WSP) acting as an attribute provider, the web service consumer server having:
a first output unit for sending a query to a Discovery Service device (IdP-DS) asking for a resource offering associated with an attribute of a given user, the resource offering comprising a reference to address the web service provider server;
a first input unit for receiving the resource offering from the Discovery Service device;
a second output unit for sending a request to the web service provider server for an attribute of the given user; and
a second input unit for receiving the requested attribute of the given user from the web service provider server;
the first input unit including means for receiving an indication on that user's consent by a second user other than the given user is required; and
the second output unit including means for sending the indication on that user's consent by a second user other than the given user is required towards the web service provider server.

13. The web service consumer server of claim 12, wherein:
the first input unit includes means for receiving an identifier of the second user to ask for user's consent, who is other than the given user, from the Discovery Service device; and
the second output unit includes means for sending the identifier of the second user to ask for user's consent, who is other than the given user, to the web service provider server.

14. The web service consumer server of claim 12, wherein:
the first input unit includes means for receiving from the Discovery Service device a resource offering of an Interaction Service that allows interactions between a client and a user to ask for the user's consent; and
the second output unit includes means for sending the resource offering of the Interaction Service to the web service provider server.

15. The web service consumer server of claim 12, wherein:
the given user is not enabled to provide their consent to share the attributes; and
the second user is enabled to provide consent instead of the given user to share the attributes.

16. A method for delegating a user's consent to share an attribute of a given user to a second user other than the given user, the attribute being available at a web service provider server (WSP) acting as an attribute provider for being shared with at least one web service consumer server (WSC) acting as an attribute requestor, the method comprising the steps of:
registering a resource offering associated with an attribute of a given user at a Discovery Service device (IdP-DS), the resource offering comprising a reference to address the web service provider server;
querying the Discovery Service device from the web service consumer server to ask for the resource offering;
providing the resource offering to the web service consumer server;
requesting from the web service consumer server to the web service provider server the attribute of the given user; and
receiving at the web service consumer server the requested attribute of the given user from the web service provider server;
indicating to the web service provider server that user's consent by the second user other than the given user is required;
obtaining an identifier of the second user to ask for user's consent, who is other than the given user, at the web service provider server; and
asking for user's consent to the required second user other than the given user.

17. The method of claim 16, wherein the step of obtaining the identifier of the second user to ask for user's consent includes a step of finding in a mapping module the identifier of the second user to give user's consent.

18. The method of claim 16, wherein the step of obtaining the identifier of the second user to ask for user's consent includes a step of receiving the identifier of the second user to ask for user's consent, who is other than the given user, from the web service consumer server.

19. The method of claim 16, wherein the step of obtaining the identifier of the second user to ask for user's consent includes a step of requesting the identifier of the second user to ask for user's consent, who is other than the given user, to a Discovery service device (IdP-DS).

20. The method of claim 16, further comprising a step of receiving a resource offering of an Interaction Service that allows interactions between the web service provider server and the second user, who is other than the given user, to ask for the user's consent.

21. The method of claim 16, wherein:
the given user is not enabled to provide their consent to share the attributes; and
the second user is enabled to provide consent instead of the given user to share the attributes.

22. An Interaction Service for allowing a service provider (WSP) to ask questions to any user, the Interaction Service comprising:
means for obtaining the user's consent to share user's attributes of a given user;
means for receiving a query from a querying entity asking for user's consent by a second user to share user's attributes of a given user;
means for transmitting towards the second user, whose user's consent is asked for, information identifying the given user whose user's attributes are asked for consent to be shared; and
means for providing the user's consent obtained from the second user towards the querying entity.

23. The Interaction Service of claim 22, wherein:
the given user is not enabled to provide their consent to share the attributes; and
the second user is enabled to provide consent instead of the given user to share the attributes.

\* \* \* \* \*

UNITED STATES PATENT AND TRADEMARK OFFICE
CERTIFICATE OF CORRECTION

| | | |
|---|---|---|
| PATENT NO. | : 8,104,071 B2 | Page 1 of 1 |
| APPLICATION NO. | : 12/089698 | |
| DATED | : January 24, 2012 | |
| INVENTOR(S) | : Monjas Llorente et al. | |

It is certified that error appears in the above-identified patent and that said Letters Patent is hereby corrected as shown below:

On the Title Page, in Field (56), under "OTHER PUBLICATIONS", in Column 2, Line 7, delete "Ovewiew." and insert -- Overview. --, therefor.

In Column 6, Line 57, delete "on" and insert -- of --, therefor.

Signed and Sealed this
Seventeenth Day of April, 2012

David J. Kappos
*Director of the United States Patent and Trademark Office*